US012807018B2

(12) United States Patent
Boettigheimer et al.

(10) Patent No.: US 12,807,018 B2

(45) Date of Patent: *Nov. 24, 2026

(54) FLOOR ASSEMBLY FOR INDUCTIVE CHARGING DEVICE

(71) Applicant: MAHLE International GmbH, Stuttgart (DE)

(72) Inventors: Mike Boettigheimer, Kornwestheim (DE); Thomas Himmer, Reichenbach (DE); Christopher Laemmle, Stuttgart (DE); Holger Schroth, Maulbronn (DE)

(73) Assignee: Mahle International GmbH (DE)

(*) Notice: Subject to any disclaimer, the term of this patent is extended or adjusted under 35 U.S.C. 154(b) by 519 days.

This patent is subject to a terminal disclaimer.

(21) Appl. No.: 18/568,837

(22) PCT Filed: May 24, 2022

(86) PCT No.: PCT/EP2022/064082

§ 371 (c)(1),
(2) Date: Dec. 10, 2023

(87) PCT Pub. No.: WO2022/258367

PCT Pub. Date: Dec. 15, 2022

(65) Prior Publication Data

US 2024/0286508 A1 Aug. 29, 2024

(30) Foreign Application Priority Data

Jun. 11, 2021 (DE) ......................... 102021205980.5

(51) Int. Cl.
*B60L 53/302* (2019.01)
*B60L 53/12* (2019.01)

(52) U.S. Cl.
CPC ............. *B60L 53/302* (2019.02); *B60L 53/12* (2019.02)

(58) Field of Classification Search
CPC ..................................................... B60L 53/302
See application file for complete search history.

(56) References Cited

U.S. PATENT DOCUMENTS

2015/0091518 A1 4/2015 Komma
2019/0023139 A1* 1/2019 Wechsler ................ B60L 53/39
(Continued)

FOREIGN PATENT DOCUMENTS

CN 112550013 A 3/2021
DE 102013219540 A1 4/2015
(Continued)

OTHER PUBLICATIONS

English abstract for EP3467854.
(Continued)

*Primary Examiner* — Daniel Kessie
(74) *Attorney, Agent, or Firm* — Fishman Stewart PLLC

(57) ABSTRACT

A floor assembly for an inductive charging device for inductive charging of a motor vehicle parked on an underground may include a base plate extending transversely to a spacing direction, at least one flat coil disposed spaced apart from the base plate in the spacing direction, a core arrangement for magnetic flux guidance, and at least one support. The flat coil may include a spirally wound conductor. The core arrangement may be disposed spaced apart from the base plate and the flat coil in the spacing direction. The core arrangement may include at least one core body extending transversely to the spacing direction in the form of a plate. A lower cavity may be formed between the core body and the base plate. The support may be arranged between the core body and the base plate, and may extend through the lower cavity in the spacing direction.

20 Claims, 5 Drawing Sheets

(56) References Cited

U.S. PATENT DOCUMENTS

| | | | | |
|---|---|---|---|---|
| 2021/0090797 | A1 | 3/2021 | Suzuki | |
| 2021/0129694 | A1 | 5/2021 | Laemmle | |
| 2021/0151238 | A1 | 5/2021 | Kim | |
| 2021/0185773 | A1 * | 6/2021 | Acero Acero | H05B 6/1245 |
| 2023/0016466 | A1 * | 1/2023 | Berggren | B60L 53/12 |
| 2023/0088727 | A1 * | 3/2023 | Seong | B60L 53/38 320/108 |

FOREIGN PATENT DOCUMENTS

| | | | |
|---|---|---|---|
| EP | 3467854 | A1 | 4/2019 |
| WO | 2016147598 | A1 | 9/2016 |

OTHER PUBLICATIONS

English abstract for CN112550013.
Chinese Office Action, CN202280041617.0, dated Mar. 25, 2026 (w_translation).
Chinese Search Report, CN202280041617.0, dated Mar. 25, 2026 (translation only).

* cited by examiner

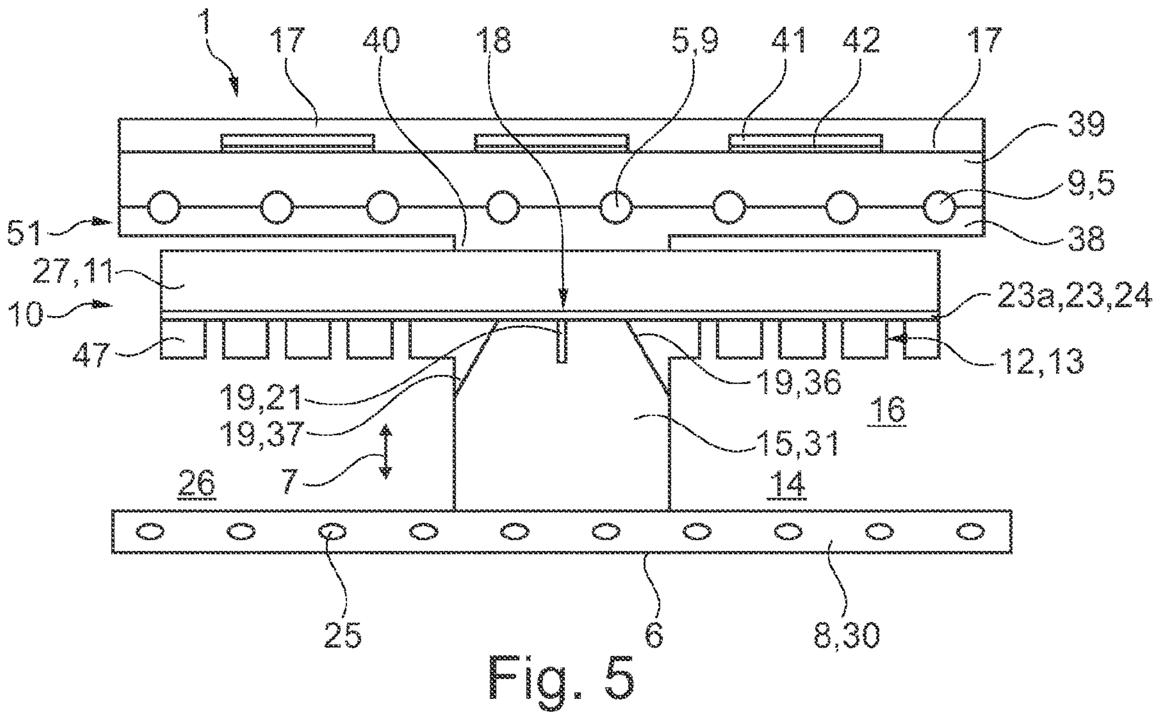
Fig. 5
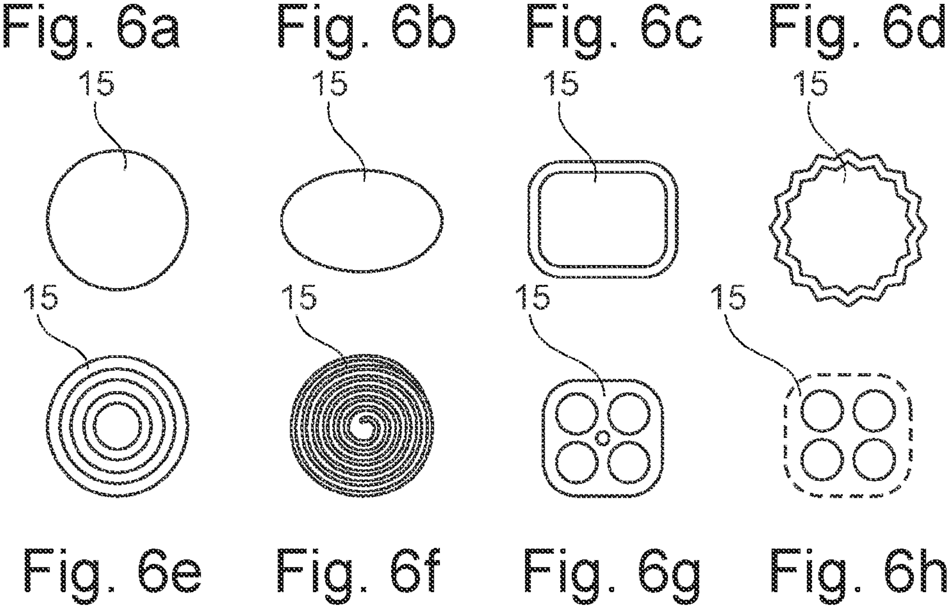
Fig. 6a Fig. 6b Fig. 6c Fig. 6d
Fig. 6e Fig. 6f Fig. 6g Fig. 6h

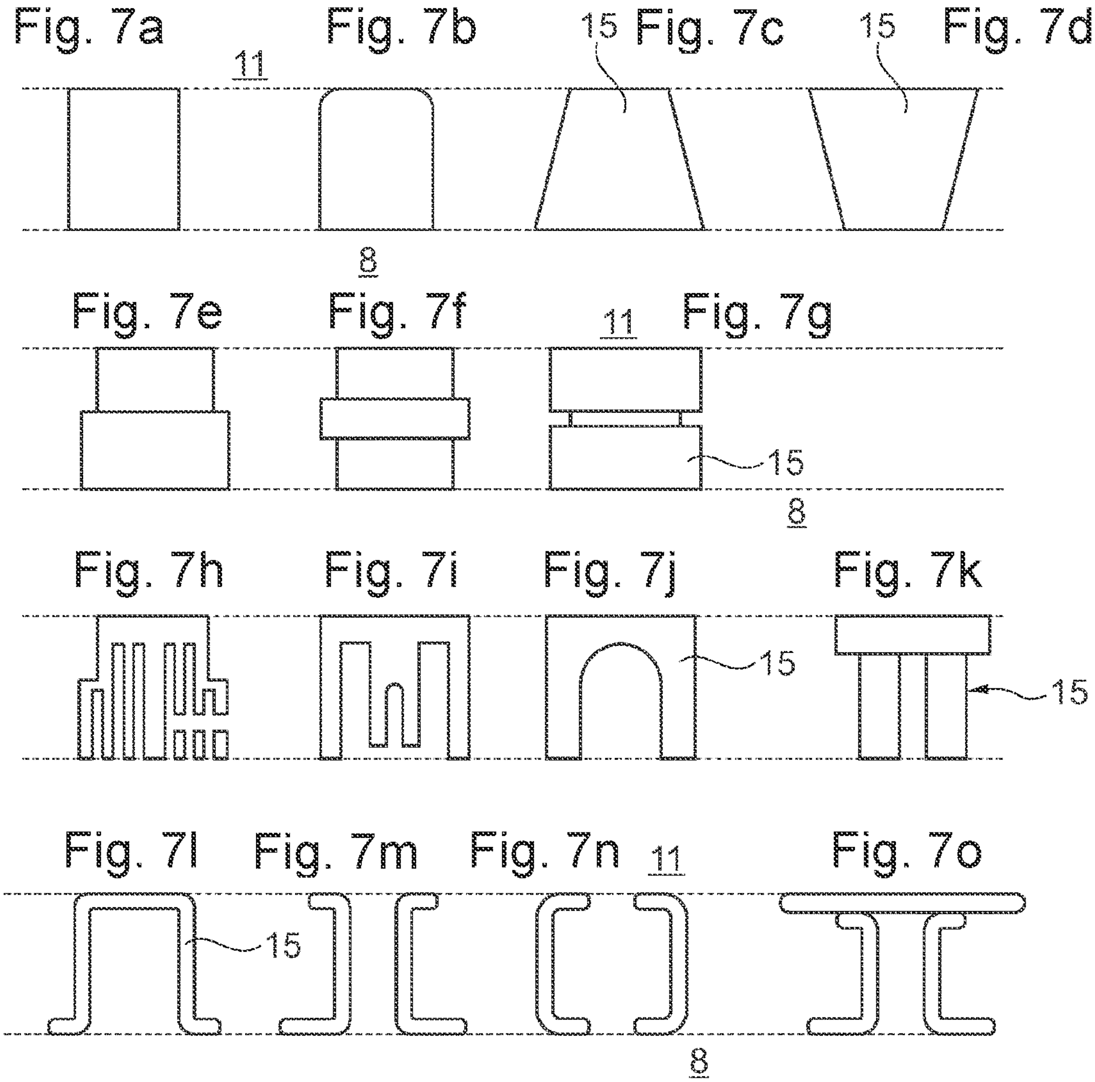
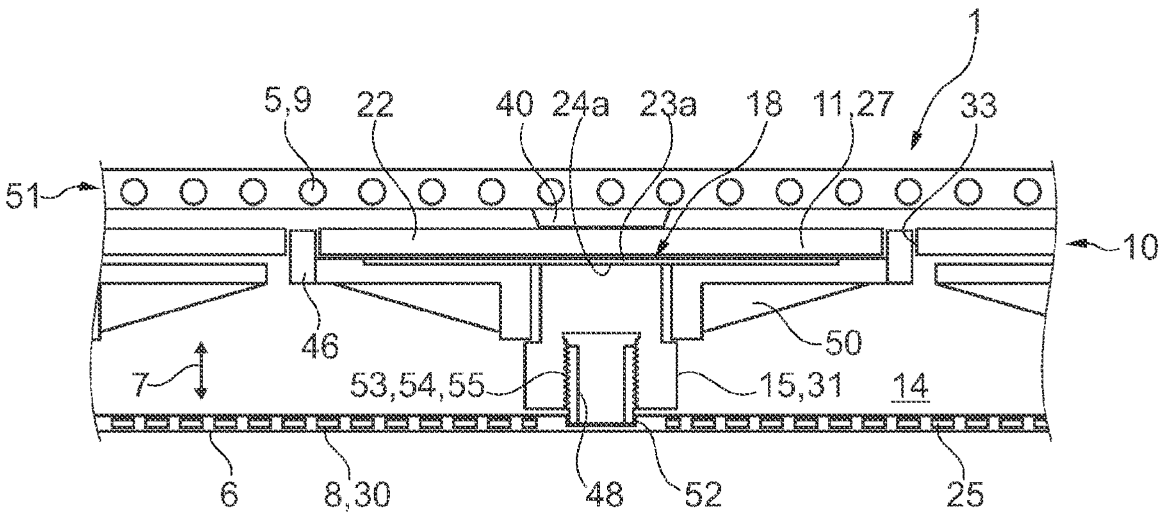
Fig. 8

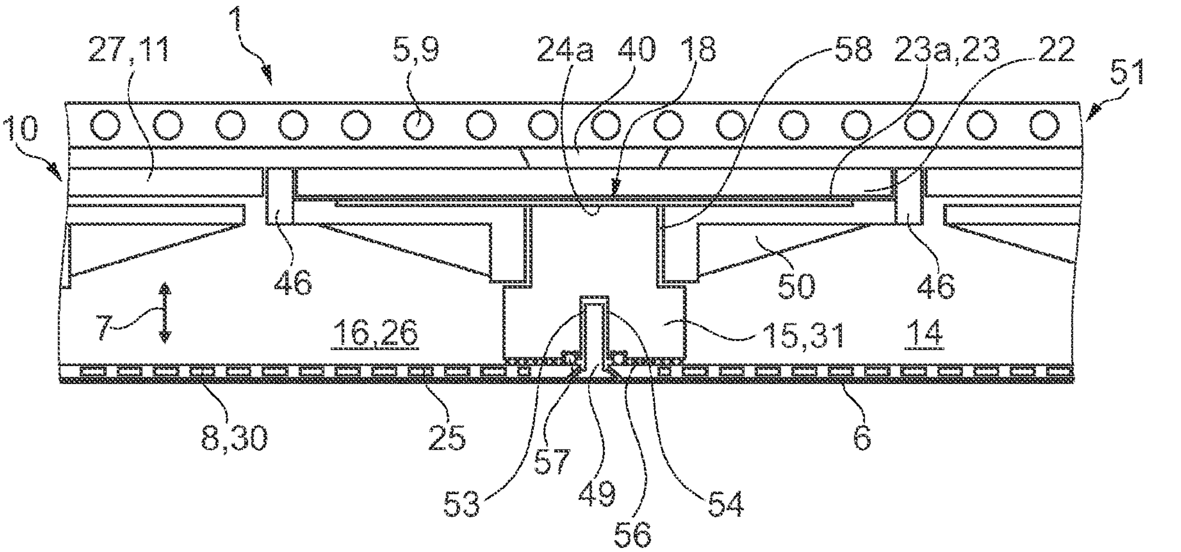
Fig. 9
Fig. 10a
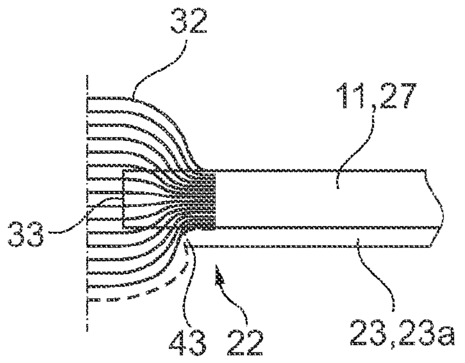
Fig. 10b
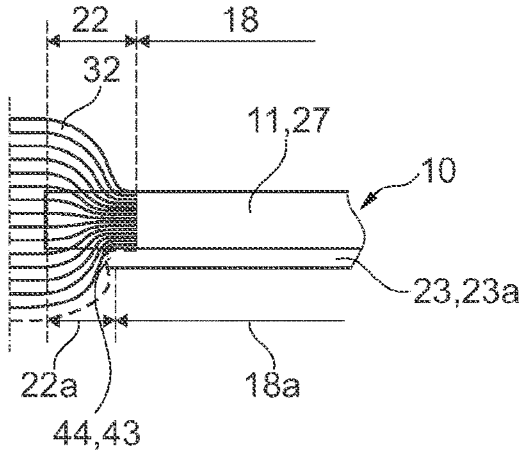
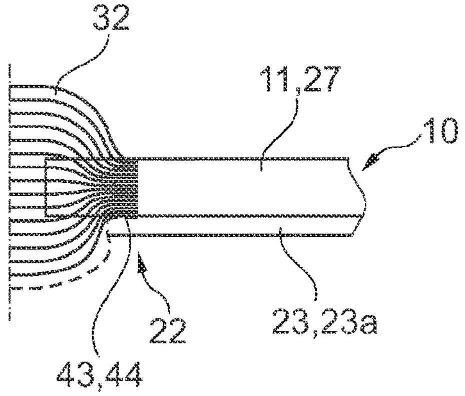
Fig. 10c
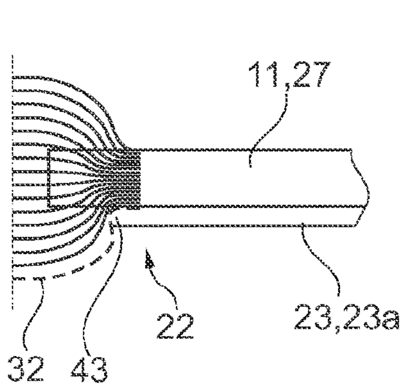
Fig. 10d

FLOOR ASSEMBLY FOR INDUCTIVE CHARGING DEVICE

CROSS-REFERENCE TO RELATED APPLICATIONS

This application claims priority to International Patent Application No. PCT/EP2022/064082, filed May 24, 2022, and German Patent Application No. DE 10 2021 205 980.5, filed Jun. 11, 2021, the contents of both of which are hereby incorporated by reference in their entirety.

TECHNICAL FIELD

The present invention relates to a floor assembly for an inductive charging device for inductive charging of a motor vehicle.

BACKGROUND

In the case of at least partially electrically powered vehicles, regular charging of the vehicle's electrical energy storage system is necessary. In principle, a direct electrical connection can be established between the vehicle and an external electrical energy source, such as a power connection. However, this requires manual action by a user.

It is also known to charge the vehicle, i.e. in particular the electrical energy storage unit, inductively. A primary coil is located in a ground assembly outside the vehicle, which interacts inductively with a secondary coil ("vehicle assembly") in the vehicle to charge the energy storage unit.

During operation of the loading device, the motor vehicle to be loaded is located on a surface above the floor assembly, which is why the floor assembly must be designed in such a way that it can bear the load of the motor vehicle to be loaded. Furthermore, during operation of the charging device, heat can be generated in the base assembly by the charging power to be provided, which can lead to an undesirable rise in temperature of the base assembly and thus also to a failure of the electrical and/or electromagnetic components.

SUMMARY

The present invention therefore deals with the problem of providing an improved or at least different embodiment for a base assembly for an inductive charging device of the type mentioned at the beginning, which in particular overcomes the disadvantages known from the prior art.

According to the invention, this problem is solved by the object of the independent claim(s). Advantageous embodiments are the subject matter of the dependent claim(s).

The present invention is based on the general idea of increasing mechanical load capacity and power transmission when charging an electric vehicle by means of a floor assembly according to the invention with a base plate and a core arrangement with core bodies and a flat coil supported above it via at least one support by using the base plate in particular as a cooling plate and the at least one support is designed as a heat-conducting element made of a material with a thermal conductivity of $\lambda>5$ W/(mK) in order to dissipate heat from, for example, the flat coil or the core arrangement via the at least one support to the cooling plate and thus heat dissipation or to improve cooling of the flat coil, the core arrangement with the ferrite plates, which enables a higher charging power with the same conductor cross section or the same charging power with a smaller conductor cross section. In order to increase the mechanical load capacity and at the same time not or only marginally influence the magnetic field of the flat coil, the at least one support is arranged transverse to the spacing direction within a central area of an associated core body of the core arrangement. The central area is thereby limited by, for example, 80% of a diameter of the individual core bodies in the longitudinal direction and width direction, preferably 70% of the diameter of the individual core bodies in the longitudinal direction and width direction, particularly preferably 50% of the diameter of the individual core bodies in the longitudinal direction and width direction and very particularly preferably 30% of the diameter of the individual core bodies in the longitudinal direction and width direction. The flat coil has a Wire carrier which has at least one pressure platform arranged coaxially to an associated support, via which the Wire carrier rests on an associated core body of the core arrangement. This arrangement causes a central loading of the respective core body by the pressure platform and the support arranged under the core body, whereby the respective core body is only subjected to pressure, but not to bending. As ferrite is very pressure-resistant, such a core body can absorb a pure compressive load very well. This eliminates the need for an additional support structure and enables direct supporting and heat-dissipating contact between the core body and the support. The core arrangement has at least one such core body, which extends transversely to the spacing direction in the shape of a plate and has the middle area essentially in the middle and an edge area surrounding it at the edge. In the middle area of the respective core body, the magnetic flux density generated there by the current flowing in the conductor of the flat coil is sufficiently low, so that an arrangement of the heat-conducting support in this area, even if it is made of metal, is not critical with regard to the impairment of the magnetic flux density. With the floor assembly according to the invention, it is thus possible to operate it with a comparatively high charging power due to the heat-dissipating supports, so that undesirable heating, in particular overheating, which would have to reduce the charging power, can be avoided. At the same time, the pressure platforms, the supports and the core bodies, which are only loaded in compression, enable a high load-bearing capacity to be achieved with a small size, as load-distributing support structures can be omitted.

The floor assembly according to the invention for an inductive charging device for inductive charging of a motor vehicle parked on an underground, for example an electric vehicle, thus has in detail the base plate, which is designed in particular as a cooling plate and extends transversely to the spacing direction in the form of a plate. The spacing direction is the surface normal of the base plate and is usually vertical when installed. In addition, the floor assembly according to the invention has at least one flat coil which is designed as a primary coil or field coil and which has a conductor which is wound in a spiral shape and at the same time is spaced apart from the base plate in the spacing direction. Also provided is the core arrangement for magnetic flux guidance, which is spaced apart from the base plate and the flat coil and arranged between the base plate and the flat coil. A lower cavity is formed between the core body and the base plate, in which the at least one support is arranged, so that this at least one support preferably extends through the lower cavity in the spacing direction. The ferrite plate and thus the core arrangement is supported on the base plate via the at least one support. The at least one support is now designed as a heat-conducting element made of a material with a thermal conductivity of λ>5 W/(mK) and at the same time arranged transverse to the spacing direction within the central area of an associated core body, for example a ferrite plate. Seen in the spacing direction, the support therefore lies within the middle area, which spans in a plane transverse to the spacing direction. The supports serve to support the core arrangement or the flat coil arranged thereon and at the same time to control its temperature by connecting the flat coil or the core arrangement and its core body in a heat-transferring manner to the base plate, which is designed in particular as a cooling plate. If the flat coil and thus also the core arrangement heats up during operation of the base assembly according to the invention, uniform cooling of the core arrangement and the flat coil can be made possible via the core bodies and via several such supports, whereby the same charging power can be achieved with a smaller cross-section of the conductor of the flat coil and/or the ferrites of the core arrangement or a higher charging power can be achieved with the same cross-section of the conductor of the flat coil and/or the ferrites of the core arrangement. The arrangement of the respective support in the central region of the associated core body in accordance with the invention, as well as a pressure pedestal arranged coaxially to the respective axis of the support on the wire carrier, also allows the support to be positioned in relation to the associated core body in a range in which eddy current losses or hysteresis losses cannot occur, even when metallic materials are used for the support. The individual core bodies, for example the ferrite plates, are spaced apart from each other transversely to the spacing direction, wherein the magnetic flux density is significantly greater both between the individual core bodies and in their edge area than in the respective middle area of the core body. This also makes it possible to transfer loads, for example from vehicles traveling on the floor assembly, preferably exclusively as compressive loads and not as bending loads via the pressure platforms into the core bodies and from these into the supports.

The floor assembly according to the invention can be arranged recessed in a substrate, in particular flush with the surface thereof, although alternatively it is of course also conceivable to arrange it on the substrate.

The at least one support has a thermal resistance $R_{th}$ between a connection surface to the core body and a connection surface to the base plate of $R_{th}$<0.5 K/W, preferably $R_{th}$<0.3 K/W, particularly preferably $R_{th}$<0.1 K/W.

In an advantageous further development of the solution according to the invention, the at least one support is made of a material with a thermal conductivity of λ>10 W/(m K), in particular a thermal conductivity of λ>50 W/(m K) or λ>100 W/(mK). For example, iron with a thermal conductivity λ of approx. 80 W/(m K) or aluminum with a thermal conductivity λ of 235 W/(mK) can be used as the material for the respective supports. In purely theoretical terms, it is even conceivable that plastics with corresponding metal particles are used, which can provide the heat transfer or thermal conductivity of λ>5 WZ(mK) required for the desired cooling effect.

In an advantageous further development of the solution according to the invention, the at least one support is at least partially made of metal, in particular aluminum. Alternatively, it is also conceivable that the at least one support is partially made of graphite or ceramic, in particular aluminum nitride or aluminum silicide. Graphite has a thermal conductivity λ of 15 to 20 W/(m K), while an aluminum nitride ceramic can even have a conductivity λ of 180 W/(m K). The use of such aluminum nitride ceramics in particular is of great interest where a lot of heat has to be dissipated, but where a material may not be electrically conductive under certain circumstances.

With the positioning according to the invention, it is thus possible for the first time to use metallic supports both for load dissipation and for heat dissipation and thus for heat dissipation or cooling of the flat coil or the core arrangement without or with only marginal influence on the magnetic field.

In an advantageous further development, the base plate has at least one cooling channel for a coolant. This enables active cooling of the base plate during operation, wherein the heat-conducting supports also cool the core arrangement or the core body and the flat coil arranged above it in the installed state. In addition, the actively cooled base plate in turn cools the air inside the lower cavity, making it possible to cool the electronics located there as well as the core arrangement or core body located above the lower cavity. Areas on which the respective supports rest on the base plate preferably have no cooling channels in order to ensure sufficient pressure stability.

The base plate itself is advantageously made of a metal or metal alloy, such as aluminum, to improve heat transfer between the coolant, base plate, air, and supports. The spaced arrangement of the base plate relative to the flat coil and the core arrangement also minimizes or at least reduces electromagnetic interaction between the base plate and the flat coil and the core arrangement. The distance between the base plate and the core arrangement in the spacing direction can be between several millimeters and several centimeters. By manufacturing the base plate from metal or a metal alloy, the floor assembly is also electromagnetically shielded from the ground below.

In a further advantageous embodiment of the floor assembly according to the invention, at least one support is circular, oval, star-shaped, rectangular with or without rounded corners or spiral-shaped in cross-section. The preferably metallic support can be made of solid material (in particular solid cylinders) or sheet material (in particular tubes or cups) or solid material with hollow chambers. In addition to a circular shape, the cross-sectional shape can also assume any other shape (e.g. rectangle, ellipse, etc.) and be variable in height, e.g. to make it easier to accommodate other components (e.g. circuit boards for the power or control electronics, support elements for the ferrites, etc.). Preference should be given to lightweight structures. Further advantages can result from optimizing the weight of the supports, e.g. hollow chamber profiles of the supports can contribute significantly to reducing the overall weight.

The support with a thermal resistance $R_T$<500 $mm^2$K/W, in particular with a thermal resistance $R_T$<300 $mm^2$K/W und and especially preferably with a thermal resistance $R_T$<100 $mm^2$K/W, is connected to the associated core body in a thermally conductive manner, for example with a material bond, in particular glued or soldered. Additionally or alternatively, the at least one support has a thermal resistance Rth between a connection surface to the core body and a connection surface to the base plate of Rth<0.5 K/W, preferably Rth<0.3 K/W, particularly preferably Rth<0.1 K/W. This enables significantly improved heat transfer and thus heat dissipation from the core bodies.

A retaining structure in the form of a plastic structure is provided for fixing at least one core body, with the plastic structure being connected to the core body and the support via a respective form-fit connection. The form-fit connection can be formed as a tongue and groove connection and/or by a conical head of the associated support and a complementary conical opening on the plastic structure. The conical head of the support and the corresponding conical opening in the plastic structure can result in a centering positive fit, which makes assembly easier. Chamfers in the joining area of the support or the plastic structure can also be helpful in this respect. In the assembled state, an upper edge of the plastic structure corresponds at least approximately to an upper edge of the support, or the plastic structure lies slightly below the upper edge of the support, so that it is ensured that a reliable heat-transferring contact, in particular also via a distribution plate (heat spreader, aluminum sheet, copper sheet, graphite foil), which is located between the core body on the one hand and the support and the plastic structure on the other hand, contacts the support. If the bonding or the thermal contacting of the distributor plate becomes loose over time and/or the distributor plate sags/bends downwards in the lateral area, the plastic structure ensures that the distributor plate remains directly attached to the core body.

To ensure that the alignment and position of the plastic structure remains constant and that it does not rotate around the axis of the support, the plastic structure and the support can still be connected via a positioning form-fit connection (e.g. tongue-and-groove), which is arranged in the area of the opening of the plastic structure or in the upper area of the support. Such a distributor plate can ensure improved heat transfer and thus improved cooling of the core arrangement, whereby it is of course clear that the distributor plate is also arranged within the central area, in particular to at least minimize any influence on the magnetic field and thus the generation of eddy current losses. In addition, the distributor plate is very flat with a thickness of <2 mm and is arranged closely below the core arrangement. In this area directly below and at a distance from the spacer areas of the core arrangement, the magnetic flux density is also significantly reduced compared to the area between the individual core bodies, as well as in their edge area, so that the use of electrically conductive materials for the distributor plate does not result in any major additional losses due to eddy currents or hysteresis effects, and the influence on the magnetic field is very low and therefore negligible.

In a particularly advantageous embodiment of the floor assembly according to the invention, the distribution plate is connected to the core arrangement via an adhesive layer with a thermal conductivity of $\lambda > 0.8$ W/(mK) and/or a shear modulus of $G < 10$ MPa. As the adhesive layer, for example an adhesive layer, is extremely thin, a reduced thermal conductivity $\lambda$ of $\lambda > 0.8$ W/(m K) is also sufficient here. In order to also be able to compensate for different thermal expansion coefficients between the core bodies, for example a ferrite plate, and the distributor plate, it is advantageous to provide the adhesive layer or the adhesive layer in general with a shear modulus $G < 10$ MPa.

Other important features and advantages of the invention can be seen from the dependent claims, from the drawings and from the associated description of the figure based on the drawings.

It is understood that the above-mentioned features and those yet to be explained below can be used not only in the combination indicated in each case, but also in other combinations or on their own, without deviating from the scope of the present invention.

Preferred exemplary embodiments of the invention are shown in the drawings by way of example and will be explained in more detail in the following description, wherein identical reference signs refer to identical or similar or functionally identical elements.

BRIEF DESCRIPTION OF THE DRAWINGS

They show, schematically in each case,

FIG. 5 shows a section through the floor assembly in the area of a support, FIGS. 6*a* through 6*h* show different possible cross-sections of the supports, FIGS. 7*a* through 7*o* show different possible longitudinal sections of the supports, FIG. 8 shows a detailed sectional view in the area of a connection of a support to the core arrangement with form-fit connection of the support to the base plate, FIG. 9 shows a detailed sectional view in the area of a connection of a support to the core arrangement with force-fit connection of the support to the base plate, FIG. 10*a* through 10*d* show different edge areas of different distributor plates on different core bodies.

DETAILED DESCRIPTION

Figure 1:
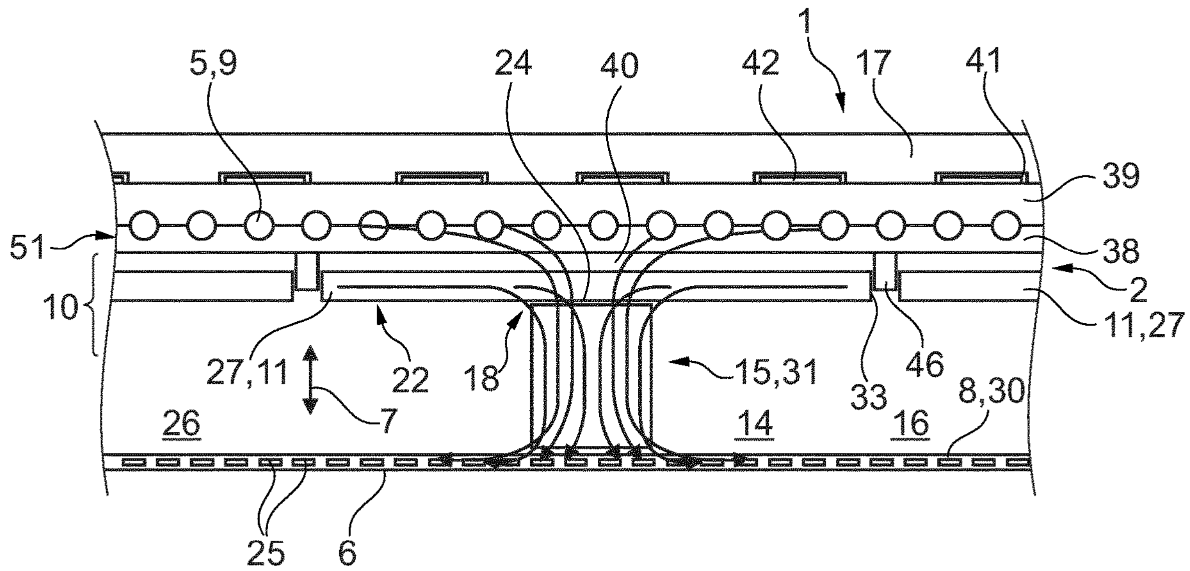
FIG. 1 shows a section through a floor assembly of an inductive charging device according to the invention.
Figure 2:
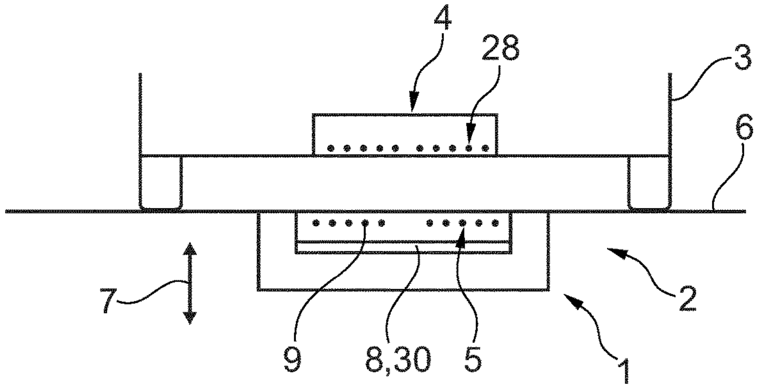
FIG. 2 shows a highly simplified illustration of the inductive charging device with the floor assembly and a motor vehicle.

A floor assembly 1 according to the invention, as shown for example in FIGS. 1 through 10, is used in a charging device 2 shown in FIG. 2 for inductive charging of a motor vehicle 3. For this purpose, the floor assembly 1 interacts with an associated assembly 4 of the motor vehicle 3, for example a secondary coil 28. The interaction takes place in particular through a flat coil 5 of the floor assembly 1, which serves as the primary coil of the charging device 2, and the secondary coil 28 of the assembly 4 of the motor vehicle 3. The motor vehicle 3 is parked on an underground 6 for inductive charging using the charging device 2. In the exemplary embodiment shown, the floor assembly 1 is recessed into the underground 6, but can also be arranged on top of it.

The floor assembly 1 has a base plate 8 that is designed in particular as a cooling plate 30. The spacing direction 7 runs parallel to a normal of the underground 6 and in particular along the perpendicular direction. As shown in FIGS. 1, 5, 8 and 9, the flat coil 5 is spaced apart from the base plate 8 in the direction of distance 7. The flat coil 5 comprises a spirally wound conductor 9, which can be made of copper, for example. The floor assembly 1 further comprises a core arrangement 10 with at least one core body 11. In addition, the core arrangement 10 is spaced apart from the flat coil 5 in the spacing direction 7. Here, the core arrangement 10 with the at least one core body 11 is arranged between the base plate 8 and the flat coil 5. The core body 11 can be made of a soft magnetic material, in particular a soft magnetic ferrite.

The core arrangement 10, in particular the at least one core body 11, is supported directly on a support 15, for example (see FIG. 1). A holding structure 13 designed as a plastic structure 12 can also be provided for fixing the at least one core body 11, which is designed as a ferrite plate 27, for example. The plastic structure 12 can be connected to the support 15 via a respective form-fit connection 19. The form-fit connection 19 itself can be designed as a tongue and groove connection 21 (see FIG. 5), whereby it is also conceivable, additionally or alternatively, that the form-fit connection 19 is formed by a conical head 36 of the associated support 15 and a complementary conical opening 37 on the plastic structure 12.

The plastic structure 12 can hold several core bodies 11 (see also FIGS. 3 and 4) or several plastic structures 12 can hold several core bodies 11, with each plastic structure 12 holding, for example, only one associated core body 11 (see FIGS. 8, 9). The plastic structure 12 can be manufactured with comparatively thin walls, provided that it has ribs 47 which increase the rigidity of the plastic structure 12. Alternatively, it can be designed with thicker walls and without (stiffening) ribs 47. Optionally, it can also be designed as a perforated panel. This saves material and weight and the holes can be used to attach (electronic) components located underneath the plastic structure 12 (insert or screw in).

Figure 3:
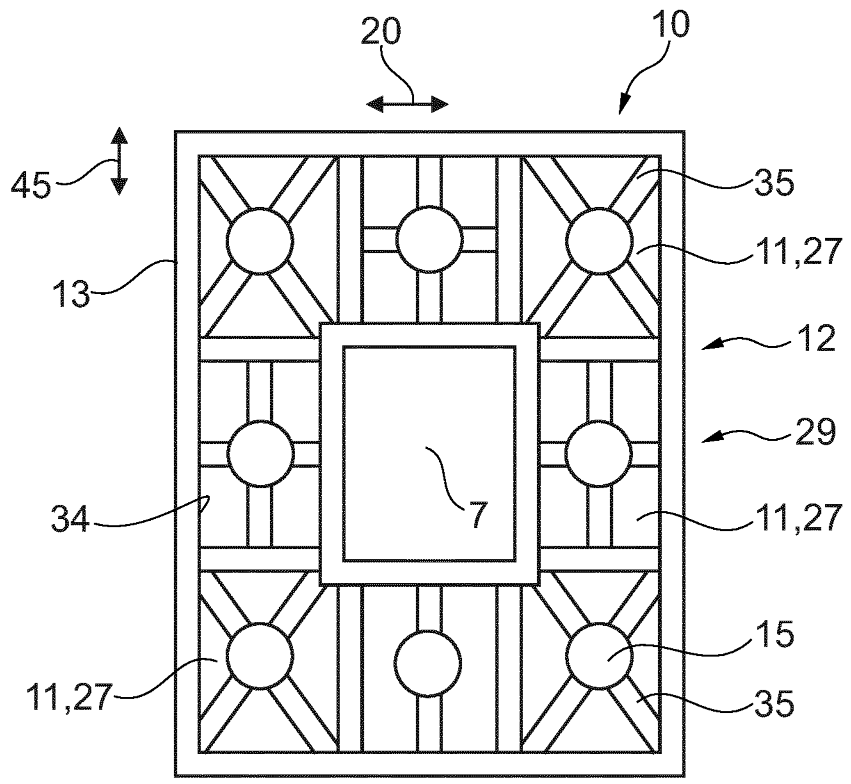
FIG. 3 shows a view from below of the core arrangement of the bottom assembly.
Figure 4:
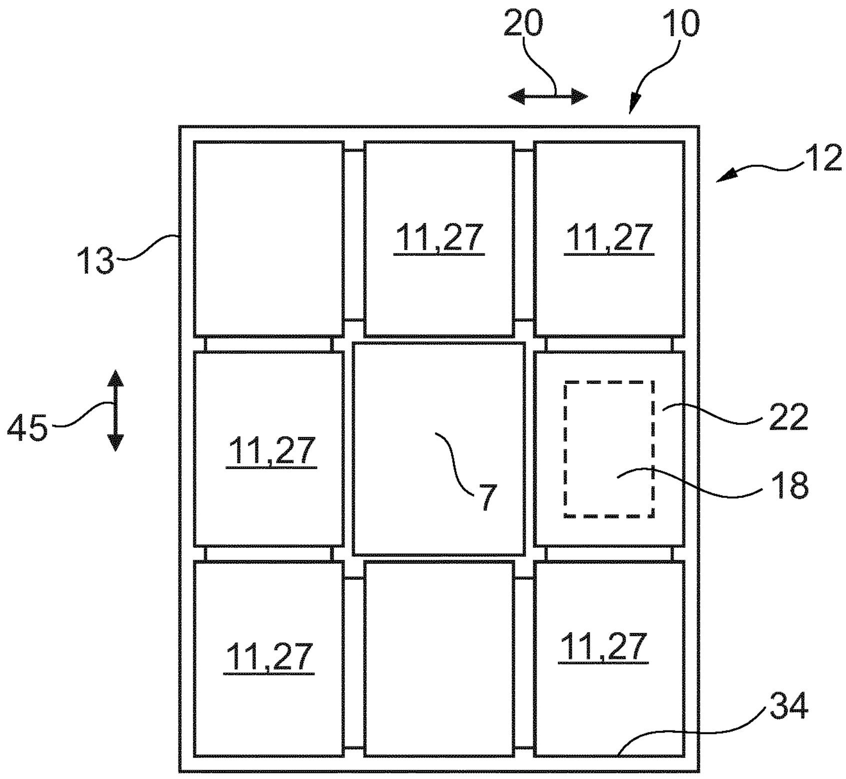
FIG. 4 shows a view from above of the core arrangement.

FIG. 3 shows a view from below of the core arrangement 10 with retaining structure 13. Only the plastic structure 12 and the core arrangement 10 as well as the core bodies 11, for example the ferrite plates 27, can be seen in FIG. 3. FIG. 4 shows a top view of the core arrangement 10, showing the core body 11 and the plastic structure 12. FIG. 5 shows a section through the floor assembly 1 in the area of a support 15.

As can be seen in particular from FIG. 3, the floor assembly 1 of the embodiments shown has, by way of example only, eight core bodies 11, which are rectangular and identical by way of example. The respective core body 11 is plate-shaped and extends plate-shaped in the width direction 20 as well as in a longitudinal direction 45 running transverse to the width direction 20 and transverse to the spacing direction 7.

As can also be seen in FIG. 3, at least two spaced-apart supports 15 are attached to the plastic structure 12. The supports 15 have a columnar design and are particularly cylindrical in shape. In the exemplary embodiments shown, at least one of the supports 15 is arranged centrally of the associated core body 11 with respect to an associated core body 11, that is, centrally in the width direction 20 and in the longitudinal direction 45. Seen in the spacing direction 7 within the middle area 18. Furthermore, in the embodiment examples shown, a single such support 15 is assigned to the respective core body 11, so that the plastic structure 12 has a total of eight supports 15 corresponding to the number of core bodies 11. The respective core body 11 preferably rests on the associated support 15. As can be seen in particular in FIG. 3, the respective support 15 is smaller in cross-section than the associated core body 11. In the exemplary embodiments shown, the supports 15 are also identically designed in accordance with the identical design of the core bodies 11. However, it is also possible for individual or all core bodies 11 and/or individual or all supports 15 to have different shapes.

As can be seen in particular from FIG. 3, the retaining structure 13 for the respective core body 11 has an opening 34, which fluidically connects the underside 29 of the core body 11 to the lower cavity 14. Thus, the air in the lower cavity 14, in particular the air flowing through the lower cavity 14, is in direct contact with the underside 29 and can improve the cooling of the core body 11. As can also be seen in particular from FIG. 3, the plastic structure 12 for the respective opening 34 has at least one associated strut 35 for stiffening and/or mechanically stabilizing the holding structure 13 in the area of the opening 34 and the lining for the support 15. In the exemplary embodiments shown, at least two such struts 35 are provided for the respective opening 34, which are spaced apart from one another. The respective strut 35 extends transversely to the spacing direction 7. In FIG. 3, purely as an example, four struts 35 are provided for seven of the total of eight openings 34 and two struts 35 are provided for one of the openings 34. In the exemplary embodiments shown, the struts 35 of the respective opening 34 protrude from the support 15 associated with the corresponding core arrangement 10. In addition to the improved mechanical stability of the retaining structure 13, the struts 35 ensure turbulence of the air flowing through the lower cavity 14 and thus improved cooling of the core bodies 11.

The respective support 15 can in principle be solid (cf. FIG. 6*a*). FIGS. 6*a* and 6*b* show a solid round or oval cross-section. According to FIGS. 6*c*, 6*d*, hollow cross-sections or, according to FIGS. 6*e*-*g*, solid cross-sections with hollow chambers or, according to FIG. 6*h*, an overall cross-section with cover plate divided into partial cross-sections are also conceivable.

According to FIGS. 5, 8 and 9, the at least one core body 11 is arranged on the side of the retaining structure 13 facing away from the base plate 8 and is positioned by the retaining structure 13 in a plane extending transversely to the spacing direction 7. In FIG. 1, such a retaining structure 13 is arranged on a lithium carrier 51, which comprises a lower lithium carrier 38 and an upper lithium carrier 39. The conductor 9 is arranged between the upper and the lower conductor carrier 39, 38, whereby the lower conductor carrier 38 has at least one pressure platform 40, via which the conductor carrier 51 is supported on an associated core body 11 of the core arrangement 10. The pressure platform 40 is arranged coaxially to the support 15 with respect to an axis extending in the spacing direction 7, which makes it possible to introduce loads, for example from motor vehicles 3 traveling on the floor assembly 1, exclusively as compressive loads and not as bending loads into the core bodies 11 and from these into the supports 15. Since ferrite is very pressure-resistant, such a core body 11 can absorb a pure compressive load very well. This makes an additional retaining structure 13 possible, but not necessary as before, so that direct supporting and heat-dissipating contact between the core body 11 and the support 15 is also possible. Around the pressure pedestal 40, the lower wire carrier 38 is offset from the core body 11, i.e. at a distance, so that a load is applied to the core body 11 exclusively via the pressure pedestals 40. This can significantly increase the mechanical load capacity and the loading capacity of the floor assembly 1.

Spacer elements 46 can protrude from the lower wire carrier 39 in the direction of the core bodies 11, allowing the core bodies 11 to be positioned transversely to the spacing direction 7.

The core body 11 also has a central region 18 and at least one edge region 22 (cf. FIGS. 1, 4, 5, 8 and 9). A lower cavity 14 is arranged between the holding structure 13 and the base plate 8, through which an air flow path 26 can pass and/or in which at least one electronic component is arranged. The at least one support 15 extends through the lower cavity 14 in the spacing direction 7. At least one of these supports 15 is designed as a heat-conducting element 31 made of a material with a thermal conductivity $\lambda$ of $\lambda > 5$ W/(mK) and is arranged transversely to the spacing direction 7 within the central area 18 of an associated core body 11 and connects this and the base plate 8 in a heat-transferring manner. This offers the great advantage that both the core arrangement 10, the flat coil 5 with its conductor 9 and the core bodies 11, for example the ferrite plates 27, can be connected to the base plate 8, which is designed as a cooling plate 30, in a heat-transferring manner via the supports 15, which are designed as heat-conducting elements 31, and can be effectively cooled via them. By contacting the supports 15 in the associated central area 18 with the associated core body 11, the magnetic field generated by the flat coil 5 and in particular the magnetic flux density is also minimized, so that even metallic materials can be considered for the supports 15 designed as heat-conducting elements 31 according to the invention.

The support 15 only partially fills the lower cavity 14, leaving a flow space 16 for a fluid, in the embodiment examples shown for air, whereby the core arrangement 10 can transfer heat to the base plate 8 via the air and cooling of the core arrangement 10 and the flat coil 5 can be improved and consequently the efficiency of the base assembly 1 can be increased. It is therefore also possible to operate the floor assembly 1 with high power levels, particularly several kW, and consequently to charge the vehicle 3 to be charged more quickly or not to cause derating at any operating point.

FIGS. 7*a*) through 7*o*) now show individual shapes of the supports 15. The simplest is shown in FIG. 7*a*) as a cylinder. According through FIG. 7*b*, the cylindrical shape of the support 15 is rounded at the transition to the core body 11. FIGS. 7*c*) and 7*d*) describe a truncated cone shape of the support 15. FIGS. 7*e*) through 7*g*) also show cylindrical shapes, each with a step, an annular bead or an annular groove. FIGS. 7*h*) through 7*o*) show hollow or no solid supports 15.

FIG. 8 shows a variant of the base assembly 1 in which the support 15 is thermally connected to the base plate 8 with a positive fit. A threaded ring 48 is connected to the base plate 8 via a thermally and mechanically effective connection 52, which is screwed to the associated support 15. The connection 52 can be designed as a soldered, bonded or other suitable material-locking connection. It is also conceivable that the threaded ring 48 is formed onto the base plate 8 as an integral component via a bending process. The threaded ring 48 is provided with an external thread 53. An internal thread 54 on the inner surface of the support 15 engages in the external thread 53 of the threaded ring 48 during the screw connection and thus connects the support 15 to the threaded ring 48 and therefore to the base plate 8. This connection can also be used to adapt the screw-in depth in the spacing direction 7 to individual conditions (e.g. tolerances) and thus ensure a tolerance-free or at least low-tolerance position of the upper surface of the support 15. The thread between the external thread 53 of the threaded ring 48 and the internal thread 54 of the support 15 can be filled with a thermal interface material 55, e.g. a heat-conducting paste or a thermal oil, in order to improve the heat transfer. A thermally conductive adhesive can also be used as a thermal interface material, which after curing provides a positional locking between the threaded ring 48 and the support 15. The support 15 can have a stepped change in cross-section and a central internal thread for screwing to the threaded ring 48. This allows the support 15 to be fixed at a distance 7 from the base plate 8 and at right angles to it.

In FIG. 9, the structure is similar, but the central internal thread 54 on the support 15 is smaller and is intended for screwing in a screw 49, via which a force-locking connection of the support 15 to the base plate 8 can be made. For this purpose, the screw 49 penetrates the base plate 8 in such a way that a fluidic connection is created between the surroundings and the interior 14. To prevent the ingress of moisture from the environment into the interior 14, a ring seal 57 can be inserted between the support 15 and the base plate 8 coaxially to the screw 49. Furthermore, to improve the thermal transition between the support 15 and the base plate 8, a thermal interface material 56, e.g. a heat-conducting paste, a thermal oil or a graphite foil, can be introduced into the space between the support 15 and the base plate 8.

Conveniently, a distributor plate 23 is arranged between the at least one support 15 and the core arrangement 10 or the retaining structure 13. Such a distributor plate 23 can ensure improved heat transfer and thus improved cooling of the core arrangement 10, wherein it is of course clear that the distributor plate 23 is also preferably arranged within the middle area 18, in particular in order to at least minimize an influence on the magnetic field and thus the generation of eddy current losses. Since the distributor plate 23 with a thickness <2 mm is arranged very flat and close below the core arrangement 10, the central area 18*a* associated with the distributor plate 23 can be larger and the edge area 22*a* associated with the distributor plate 23 can be smaller than the central area 18 or edge area 22 associated with the support 15, without large additional losses due to eddy currents or hysteresis effects in an electrically conductive material of the distributor plate 23 that cannot be tolerated (see FIG. 10*b*).

The manifold plate 23 can also be connected to the core arrangement 10 via an adhesive layer 24 made of a material with a thermal conductivity of $\lambda > 0.8$ W/(mK) and/or a shear modulus of G<10 MPa. Since the adhesive layer 24, for example an adhesive layer, is extremely thin and has a large bonding surface to the core arrangement 10, a reduced thermal conductivity $\lambda$ of $\lambda > 0.8$ WZ(m K) is also sufficient here. Furthermore, in order to be able to compensate for different thermal expansion coefficients between the core bodies 11, for example a ferrite plate 27 and the distributor plate 23, it is advantageous to provide the adhesive layer or generally the adhesive layer 24 with a shear modulus G<10 MPa. The adhesive layer 24 can, of course, also be provided directly between the support 15 and the core body 11 if, for example, no distributor plate 23 is provided. An additional adhesive layer 24*a* can also be provided between the distributor plate 23 and the support 15 if a distributor plate 23 is present.

A thickness of the distributor plate 23 or the distributor layer 23*a* is in the range of 0.2 to 2.0 mm. In addition to increasing the heat-transferring contact surface between the core body 11 and the support 15, the at least one distributor plate 23 can also fulfill a support function. An insulating layer 58 can also be provided between the electrically conductive distributor plate 23 and the core body 11 and/or between this and the support 15.

As shown in FIGS. 8 and 9, a bracket 50 is also provided to support the core body 11. In this case, the spacer elements 46 for positioning the associated core body 11 are arranged on the bracket 50, in particular formed integrally with it. In FIGS. 8 and 9, the distributor plate 23 can be formed as a distributor layer 23*a*, for example as a metal foil, a sheet metal or a thermal interface material.

The distribution layer 23*a* has a lateral thermal conductivity $\lambda > 20$ W/(m K), preferably $\lambda > 50$ W/(m K), particularly preferably $\lambda > 100$ W/(m K)). Such a distribution layer 23*a* may, for example, consist of graphite, i.e. be a graphite foil. Such a graphite foil is characterized by an anisotropic thermal conductivity due to its production, which has 5 W/(mK)$<\lambda<$10 W/(m K) in the thickness direction and $\lambda > 100$ W/(m K) in the lateral direction. Due to this high lateral thermal conductivity, the heat can be conducted very well from the edge areas of the core body 11 to the support 15, which homogenizes the temperature distribution in the core body 11 during operation and reduces the risk of thermo-mechanical failure. Alternatively, a sheet made of a thermally conductive material (e.g. aluminum, copper) can be used. Since these materials have an electrical conductivity which leads to an interaction with an alternating magnetic field, care must be taken to ensure that such an electrically conductive distributor layer 23*a* or such a distributor plate 23 is used in an area, namely the central area 18 or a larger central area 18*a*, in which the existing field strength is sufficiently low (e.g. <1 mT) in order to avoid a significant influence on the magnetic field and associated losses. Such a position is given, for example, directly below the core body 11 if the outer edge 43 of the distributor layer 23*a* or distributor plate 23 is sufficiently recessed (e.g. 5 . . . 25 mm) in relation to the edge of the magnetic conductor, i.e. the core body 11. The distance must be matched to the strength of the magnetic stray field at the ferrite edge and can vary within a core body 11 over the circumference or may not apply at all.

According to FIGS. 10*a* to *d*, the magnetic field lines are designated by the reference sign 32, which clearly shows that in the area of the supports 15, the magnetic field lines 32 run directly on or in the core body 11 and are therefore not disturbed even when a metallic support 15 is used, which means that no eddy currents or hysteresis losses occur. The respective edge area 22 is different in size in different directions and also with regard to different orientations of the core bodies 11, wherein it can be seen that the magnetic field lines 32 already run shortly next to a lateral edge 33 of the core body 11, for example the ferrite plate 27, in or close to the core body 11 and the magnetic field thus decreases sharply, so that the support 15 does not necessarily have to be arranged centrally transverse to the spacing direction 7 on the respective core body 11, but the middle area 18 has a certain size (see FIG. 4) and thus allows an individual displacement of the support 15. Since it is known that particularly sharp-edged electrically conductive and magnetic field lines 32 penetrating geometries generate particularly high losses due to eddy currents and hysteresis effect, an outer edge 43 of at least one distributor plate 23 can also have a chamfer 44 or be rounded. In FIG. 10*a*, the outer edge 43 of the distributor plate 23 is sharp-edged, causing magnetic field lines 32 to run through the outer edge 43. In FIG. 10*b*, the outer edge 43 has a chamfer 44 and in FIG. 10*c* two chamfers 44. In FIG. 10*d*, the outer edge is rounded, allowing the magnetic flux around the distributor plate 23 to be as streamlined as possible.

This avoids losses that can be concentrated at sharp edges.

In the exemplary embodiments shown, the floor assembly 1 has a cover plate 17. Cavities 41 are provided between the cover plate 17 and the upper wire carrier 39, in which, for example, a circuit board 42 can be arranged. In the exemplary embodiments shown, the base plate 8 is designed as a cooling plate 30, through which cooling channels 25 for a coolant run. The coolant actively cools the base plate 8 during operation. The actively cooled base plate 8 cools the core assembly 10 or the core body 11 and the flat coil 5 via the supports 15 and also the air and consequently the flat coil 5 and the core assembly 10 via the air. The base plate 8 is advantageously made of a metal or a metal alloy, in particular aluminum, in order to improve the heat transfer between the coolant, base plate 8 and air. The spaced arrangement of the base plate 8 relative to the flat coil 5 and core arrangement 10 minimizes or at least reduces magnetic or electromagnetic interaction of the base plate 8 with the flat coil 5 and the core arrangement 10. The distance between the base plate 8 and the core body 11 can be between 20 and 80 mm. By manufacturing the base plate 8 from a metal or metal alloy, the floor assembly 1 is also electromagnetically shielded.

The support 15 is preferably connected to the associated core body 11 and the base plate (8) in a thermally conductive manner with a thermal resistance $R_T$<500 mm$^2$K/W, in particular with a thermal resistance $R_T$<300 mm$^2$K/W and particularly preferably with a thermal resistance $R_T$<100 mm$^2$K/W. In particular, soldering or bonding can be used here, which enables a mechanical connection on the one hand and a heat-transferring connection on the other. Additionally or alternatively, the at least one support 15 has a thermal resistance $R_{th}$ between a connection surface to the core body 11 and a connection surface to the base plate 8 of $R_{th}$<0.5 K/W, preferably $R_{th}$<0.3 K/W, particularly preferably $R_{th}$<0.1 K/W.

Several advantages can be achieved with the floor assembly 1 according to the invention:

- improved heat dissipation and loading of the core bodies 11 and thus a long service life and low risk of breakage,
- no additional active components to improve heat transfer, in particular no air flow,
- thin structure of the thermal connection by using thermally conductive supports 15, in particular made of metal,
- free installation space for electronic components including mounting options for electronic components,
- simple and cost-effective assembly,
- flexibly adaptable to power class and ambient conditions,
- functional integration of electromagnetics-electronics-thermics-mechanics.

The invention claimed is:

1. A floor assembly for an inductive charging device for inductive charging of a motor vehicle parked on an underground, comprising:

a base plate extending transversely to a spacing direction in the shape of a plate;

at least one flat coil including a spirally wound conductor, the at least one flat coil disposed spaced apart from the base plate in the spacing direction;

a core arrangement for magnetic flux guidance, the core arrangement disposed spaced apart from the base plate and the at least one flat coil in the spacing direction and arranged between the base plate and the conductor;

the core arrangement including at least one core body extending transversely to the spacing direction in the form of a plate, the at least one core body having a central area and at least one edge area;

a lower cavity is formed between the at least one core body and the base plate;

at least one support arranged between the at least one core body and the base plate, the at least one support extending through the lower cavity in the spacing direction;

wherein the at least one support is a heat-conducting element composed of a material with a thermal conductivity greater than 5 W/(mK) and is arranged transversely to the spacing direction within the central area of an associated core body of the at least one core body and connects the associated core body and the base plate in a heat-transferring manner; and wherein the at least one flat coil includes a conductor carrier, the conductor carrier including at least one pressure platform arranged coaxially to an associated support, of the at least one support and via which the conductor carrier rests on an associated core body of the at least one core body.

2. The floor assembly according to claim 1, wherein the thermal conductivity of the material of the at least one support is greater than 10 W/(mK).

3. The floor assembly according to claim 1, wherein at least one of:

the base plate includes at least one cooling channel through which a coolant is flowable; and the base plate is at least partially composed of metal.

4. The floor assembly according to claim 1, wherein the at least one support is at least partially composed of graphite, and metal.

5. The floor assembly according to claim 1, wherein:

the at least one support has a thermal resistance $R_T$ less than 500 $mm^2K/W$ and is thermally conductively connected to the associated core body and the base plate; and the at least one support has a thermal resistance $R_{th}$ between a connection surface to the associated core body and a connection surface to the base plate of $R_{th}$ less than 0.5 K/W.

6. The floor assembly according to claim 1, further comprising a retaining structure configured as a plastic structure for fixing the at least one core body, wherein the plastic structure is connected to the at least one support via a form-fit connection.

7. The floor assembly according to claim 6, wherein the form-fit connection is at least one of:

a tongue and groove connection; and formed by a conical head of the at least one support and a complimentary conical opening of the plastic structure.

8. The floor assembly according to claim 1, further comprising a distributor plate arranged between the at least one support and the at least one core body.

9. The floor assembly according to claim 8, wherein the distributor plate is connected to the at least one core body via an adhesive layer composed of a material with at least one of (i) a thermal conductivity greater than 0.8 W/(mK) and (ii) a shear modulus less than 10 MPa.

10. The floor assembly according to claim 8, wherein an outer edge of the distributor plate at least one of (i) has a chamfer and (ii) is rounded.

11. The floor assembly according to claim 1, further comprising at least one of:

an air flow path extending through the lower cavity; and at least one electronic component arranged in the lower cavity.

12. The floor assembly according to claim 1, further comprising:

a cover plate arranged on a side of the at least one flat coil facing away from the base plate and disposed at a distance from the at least one flat coil in the spacing direction; and a circuit board arranged between the at least one flat coil and the cover plate.

13. The floor assembly according to claim 1, wherein the at least one support has a cross-section that is one of circular, oval, star-shaped, rectangular with rounded corners, rectangular without rounded corners, and spiral-shaped.

14. The floor assembly according to claim 1, wherein the at least one support has a length in the spacing direction of 20 mm to 80 mm.

15. The floor assembly according to claim 1, wherein:

the conductor carrier includes a lower conductor carrier and an upper conductor carrier;

the conductor is arranged between the lower conductor carrier and the upper conductor carrier; and the at least one pressure platform is arranged on the lower conductor carrier.

16. The floor assembly according to claim 1, wherein the base plate is a cooling plate.

17. The floor assembly according to claim 2, wherein the thermal conductivity of the material of the at least one support is greater than 50 W/(mK).

18. The floor assembly according to claim 9, wherein:

the thermal conductivity of the material of the adhesive layer is greater than 0.8 W/(mK); and an outer edge of the distributor plate is rounded.

19. The floor assembly according to claim 9, wherein:

the shear modulus of the material of the adhesive layer is less than 10 MPa; and an outer edge of the distributor plate includes a chamfer.

20. A floor assembly for an inductive charging device for inductive charging of a motor vehicle parked on an underground, comprising:

a base plate extending transversely to a spacing direction in the shape of a plate;

at least one flat coil including a spirally wound conductor, the at least one flat coil disposed spaced apart from the base plate in the spacing direction;

a core arrangement for magnetic flux guidance, the core arrangement disposed spaced apart from the base plate and the at least one flat coil in the spacing direction and arranged between the base plate and the conductor, the core arrangement including at least one core body extending transversely to the spacing direction in the form of a plate, the at least one core body having a central area and at least one edge area;

a lower cavity formed between the at least one core body and the base plate;

at least one support arranged between the at least one core body and the base plate, the at least one support extending through the lower cavity in the spacing direction;

a cover plate arranged on a side of the at least one flat coil facing away from the base plate;

a distributor plate arranged between the at least one support and the least one core body;

wherein the at least one support is a heat-conducting element composed of a material with a thermal conductivity greater than 5 W/(mK) and is arranged transversely to the spacing direction within the central area of an associated core body of the at least one core body and connects the associated core body and the base plate in a heat-transferring manner; and wherein the at least one flat coil includes a conductor carrier, the conductor carrier including at least one pressure platform arranged coaxially to an associated support of the at least one support and via which the conductor carrier rests on an associated core body of the at least one core body.

* * * * *